United States Patent
Scott et al.

(10) Patent No.: US 12,340,667 B2
(45) Date of Patent: Jun. 24, 2025

(54) MITIGATING EFFECTS CAUSED BY FAST MOVING OBJECTS IN A SCENE

(71) Applicant: Evolon Technology Inc., Dallas, TX (US)

(72) Inventors: Shannon Scott, White Rock, NM (US); Steven Schramm, Valley, WA (US)

(73) Assignee: Evolon Technology Inc., Dallas, TX (US)

( * ) Notice: Subject to any disclaimer, the term of this patent is extended or adjusted under 35 U.S.C. 154(b) by 635 days.

(21) Appl. No.: 17/479,351

(22) Filed: Sep. 20, 2021

(65) Prior Publication Data
US 2022/0101704 A1 Mar. 31, 2022

Related U.S. Application Data

(60) Provisional application No. 63/084,320, filed on Sep. 28, 2020.

(51) Int. Cl.
G08B 13/196 (2006.01)
G06T 7/70 (2017.01)
G06V 20/52 (2022.01)

(52) U.S. Cl.
CPC .......... G08B 13/19602 (2013.01); G06T 7/70 (2017.01); G06V 20/52 (2022.01); G06T 2207/20076 (2013.01); G06T 2207/30232 (2013.01)

(58) Field of Classification Search
CPC ................ G08B 13/19602; G06T 7/70; G06T 2207/20076; G06T 2207/30232; G06V 20/52; G06V 10/25; G06V 10/36
See application file for complete search history.

(56) References Cited

U.S. PATENT DOCUMENTS

| | | | | |
|---|---|---|---|---|
| 5,644,386 A | * | 7/1997 | Jenkins | G01S 17/86 250/342 |
| 6,977,664 B1 | * | 12/2005 | Jinzenji | G06T 7/254 382/243 |
| 9,848,167 B1 | * | 12/2017 | Christian | H04N 7/142 |
| 9,984,466 B1 | * | 5/2018 | Duran | H04N 23/67 |
| 2005/0100238 A1 | * | 5/2005 | Arata | G06T 5/20 382/262 |
| 2006/0098107 A1 | * | 5/2006 | Lee | H04N 25/68 348/241 |
| 2007/0025615 A1 | * | 2/2007 | Zhou | G06V 20/49 382/173 |
| 2009/0123085 A1 | * | 5/2009 | Yoshimura | G06T 5/40 382/264 |
| 2009/0201382 A1 | * | 8/2009 | Makino | H04N 5/2625 382/103 |
| 2014/0044232 A1 | * | 2/2014 | Liu | H04N 23/30 378/62 |
| 2014/0254937 A1 | * | 9/2014 | Fu | H04N 13/128 382/195 |
| 2016/0219281 A1 | * | 7/2016 | Yoshikawa | H04N 19/30 |
| 2017/0214425 A1 | * | 7/2017 | Kwon | H04B 1/401 |
| 2018/0018522 A1 | * | 1/2018 | Litvak | G06V 20/40 |
| 2018/0033120 A1 | * | 2/2018 | Wang | H04N 23/81 |
| 2019/0297219 A1 | * | 9/2019 | Santi | G06V 10/25 |
| 2022/0150515 A1 | * | 5/2022 | Adzic | H04N 19/65 |

* cited by examiner

Primary Examiner — Xuemei G Chen
(74) Attorney, Agent, or Firm — Schultz & Associates, P.C.

(57) ABSTRACT

The present application describes a system and method for mitigating false alarms caused by fast moving objects in a scene.

15 Claims, 5 Drawing Sheets

MITIGATING EFFECTS CAUSED BY FAST MOVING OBJECTS IN A SCENE

PRIORITY TO RELATED APPLICATIONS

This application claims the benefit of U.S. Provisional Application No. 63/084,320, filed Sep. 28, 2020, which is incorporated by reference herein in it's entirety.

BACKGROUND

Video surveillance systems are typically used to monitor various areas and detect the presence of intruders. However, the accuracy of these systems may be affected by various fast moving objects that move through a captured scene.

TECHNICAL FIELD

The present invention relates in general to video processing and in particular to video surveillance analytics.

SUMMARY

The present application describes a system and method for mitigating false alarms in camera-to-camera control systems caused by fast moving objects in a scene. In some examples, the fast moving objects may be the result of environmental conditions such as rain, snow, leaves and so on. In another example, the fast moving objects may be insects that are drawn to or near one or more cameras of the camera-to-camera control system. The false alarms are mitigated by causing a camera of the camera-to-camera control system to capture a number of images of a scene, identifying corresponding pixels in each of the images, determining a median value for that pixel across all of the images and generating a resulting image once the above process has been performed for each pixel in a captured image.

Accordingly, the present application describes a method that includes receiving a series of captured images of a particular scene over a time period and identifying a first pixel in each captured image of the series of captured images. In an example, the first pixel in each captured image of the series of captured images is associated with a pixel coordinate. A pixel value for each first pixel in each captured image of the series of captured images is determined and a median pixel value of the pixel values is subsequently determined. The median pixel value is associated with the pixel coordinate of a resulting image.

Also described is a system comprising a processor and a memory coupled to the processor. The memory stores computer executable instructions that, when executed by the processor, perform operations. These operations include receiving a series of images associated with a period of time. A first pixel in each captured image of the series of captured images is identified. In an example, the first pixel in each captured image of the series of captured images is associated with a pixel coordinate. A pixel value for each first pixel in each captured image of the series of captured images is determined. A median pixel value of the pixel values is also determined. The median pixel value is subsequently associated with the pixel coordinate of a resulting image.

The present application also describes a method that includes receiving a first image of a scene and a second image of the scene associated with a time period. A first pixel value of a first pixel in the first image is identified. A second pixel value of a second pixel in the second image is also identified. In an example, a pixel coordinate of the first pixel matches a pixel coordinate of the second pixel. A median pixel value is determined. The median pixel value is based, at least in part, on the first pixel value and the second pixel value. A resulting image is generated using the median pixel value in a pixel coordinate of the resulting image that matches the pixel coordinate of the first pixel and the pixel coordinate of the second pixel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Camera-to-camera control systems typically include a first camera having a fixed field of view and a second camera (e.g., a pan, tilt and zoom (PTZ) camera) that is moveable (e.g., in response to instructions received from the first camera) within the fixed field of view. As objects of interest move through the fixed field of view, the first camera may send movement instructions to the second camera that causes the second camera to track the movement of the objects of interest in real-time or substantially real-time.

However, certain environmental conditions, such as snow, rain, dust, wind, leaves etc. may trigger false alarms as these objects move through a scene. Similarly, various insects may be attracted to a light on or otherwise associated with a camera of the camera-to-camera control system. As these insects move through the scene, the insects may trigger false alarms. The conditions described above will be collectively be referred to herein as "environmental conditions."

In an effort to mitigate the false alarms caused by environmental conditions, the present application describes a process for mitigating the effects of fast moving objects through a scene. Although the examples described herein are directed to a camera-to-camera control system, the described processes may be used by a variety of different intrusion detection systems and/or image capture devices such as, for example, security cameras, video cameras, still cameras and the like.

In the past, mitigation of the effects of various environmental conditions were handled by either reducing the sensitivity of a camera associated with an intrusion detection system, turning off one or more cameras associated with the intrusion detection system, or by training an individual that monitors the intrusion detection system to simply ignore any false alarms. However, these solutions defeat the purpose of having an intrusion detection system as an intruder or other bad actor may simply wait for inclement weather prior to attempting to gain access to a monitored area undetected.

Accordingly, the present application describes a process for mitigating the effects of fast moving objects in a scene by determining a median value of each pixel in a series of captured images. Once the median value of each pixel in the series of captured images is determined, a resulting image is generated and provided to an intrusion detection system. The intrusion detection system can compare the resulting image with a reference image to detect an intrusion event and/or signal an alarm.

In an example, the median value of a pixel in the resulting image is based on a pixel value of corresponding pixels in the series of captured images over a given time period. For example, if the system captures a total of three images over a particular time period, a pixel value for a pixel having X,Y coordinates of (0,0) in the first image is determined. Likewise, a pixel value for a pixel having X,Y coordinates of (0,0) in the second image and the third image is determined. The median pixel value for all of the pixels associated with this X,Y coordinate is determined and provided to a corresponding X,Y coordinate for the resulting image.

This process is repeated for each pixel in each image of the series of captured images. The resulting median pixel value for each pixel coordinate is used to generate the resulting image and the effects of fast moving objects within a given scene are mitigated. The resulting image is provided to an intrusion detection system.

These and other examples will be explained in more detail below with respect to FIG. 1-FIG. 3.

Figure 1:
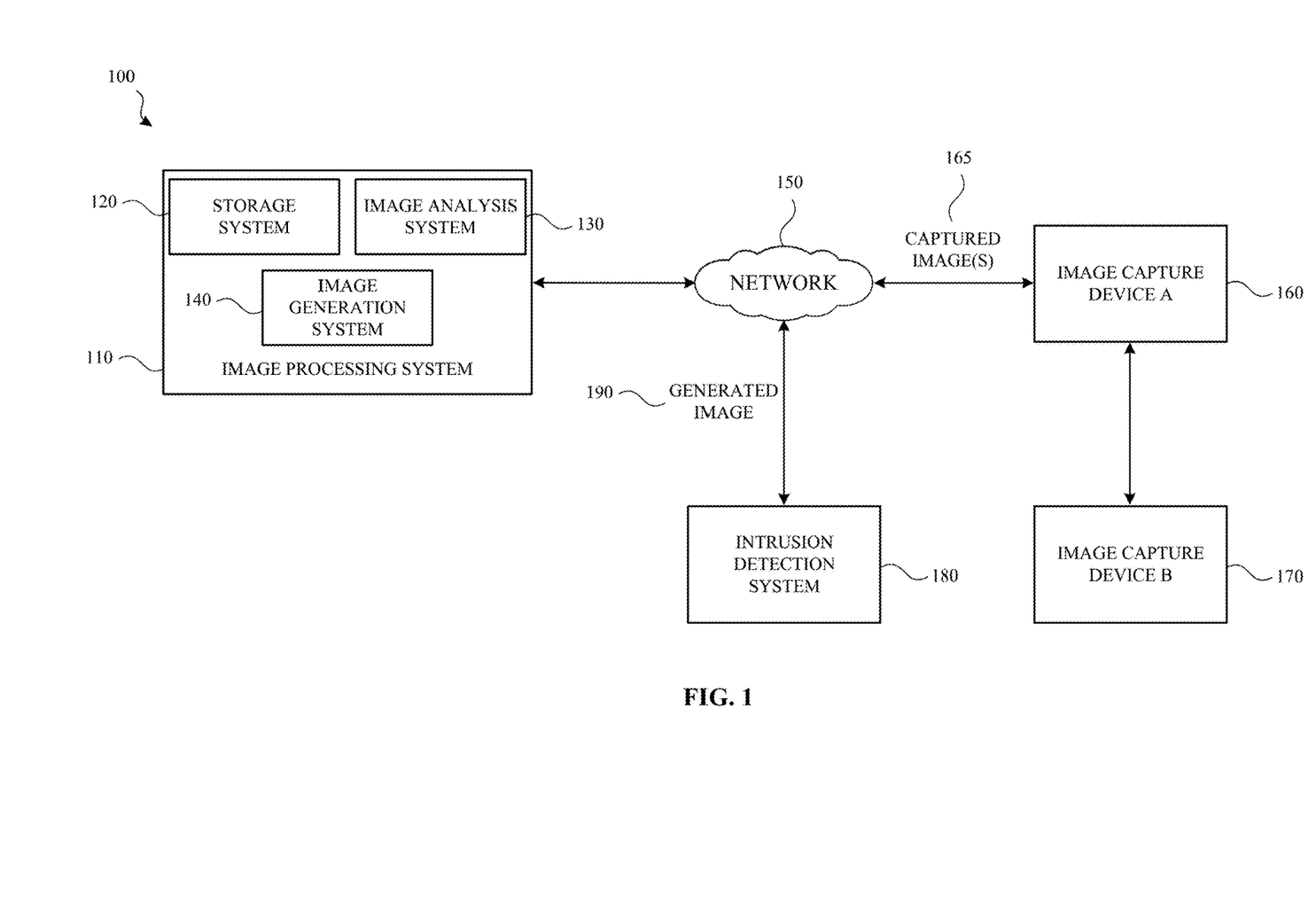
FIG. 1 illustrates an example system for mitigating the effects of fast moving objects in a scene captured by a camera-to-camera control system according to an example.

FIG. 1 illustrates an example system 100 for mitigating the effects of fast moving objects in a scene captured by a camera associated with a camera-to-camera control system according to an example. Although a camera-to-camera control system is specifically mentioned, the system 100, or portions of the system 100, may be implemented by any type of system that captures live and/or still images including, for example, single camera systems or multiple camera systems.

In an example, the system 100 includes an image processing system 110. The image processing system 110 may include a storage system 120, an image analysis system 130 and an image generation system 140.

The system 100 may also include a number of different image capture devices. In the example shown, the system 100 includes a first image capture device (Image Capture Device A 160) and a second image capture device (Image Capture Device B 170). In an example, the first image capture device is a stationary image capture device and the second image capture device is a moveable image capture device. The moveable image capture device may be a PTZ camera.

In an example, the first image capture device and the second image capture device are communicatively coupled such that instructions, images, etc. may be communicated between each image capture device. For example, if analysis of an image captured by Image Capture Device A 160 indicates that a potential threat is detected, Image Capture Device A 160 may send pan, tilt and/or zoom instructions to Image Capture Device B 170 that causes Image Capture Device B 170 to track movement of the potential threat through the scene. Although two image capture devices are shown, the system 100 may include any number of image capture devices. In another example, Image Capture Device B 170 may receive instructions from an intrusion detection system 180.

In an example, the Image Capture Device A 160 and/or the Image Capture Device B 170 may capture a series of images (represented as captured images 165). The captured images 165 may be captured over a particular time frame. For example, if the Image Capture Device A 160 is capturing or is otherwise operating at ten frames per second, the captured images 165 may include the ten captured images. Additionally, the ten captured images may be associated with the particular time frame (e.g., one second). Although a specific number of images and a time frame are given, this is for example purposes only. The captured images 165 may include any number of images captured over a specified, determined and/or default time period/frame.

The captured images 165 may include a number of fast moving objects that can cause the intrusion detection system 180 to trigger a false alarm. The fast moving objects can be associated with various environmental conditions such as blowing leaves, raindrops, snowflakes, insects and the like. For example and turning to FIG. 2A, FIG. 2A illustrates an example scene 200 in which raindrops are falling within the scene and the effects of the fast moving raindrops have not been mitigated.

Figure 2A:
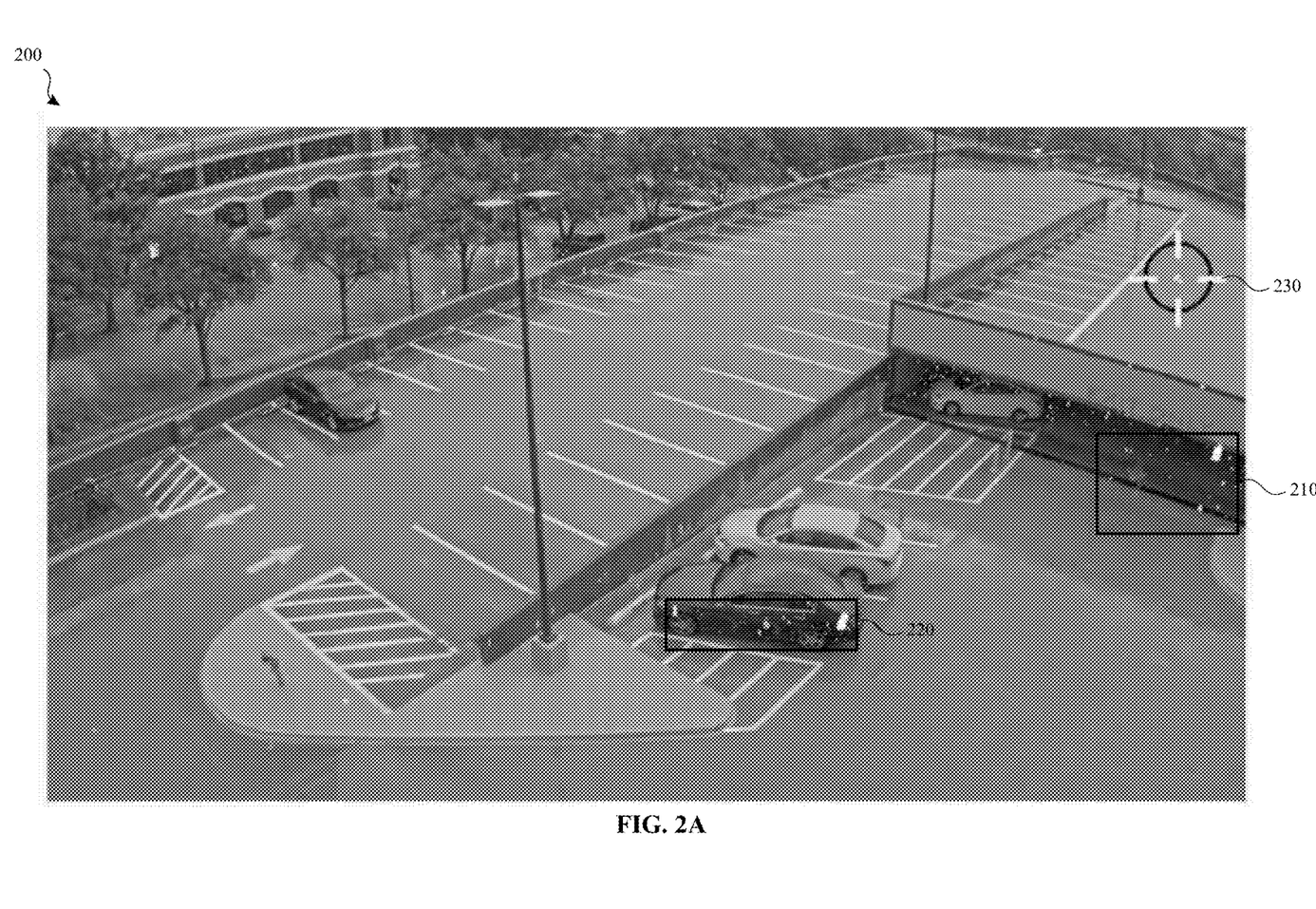
FIG. 2A illustrates an example scene in which the effects of fast moving objects have not been mitigated according to an example.

As shown in FIG. 2A, the raindrops (highlighted by box 210 and 220) falling through the scene 200 may distort the captured image and may cause the intrusion detection system 180 to trigger false alarms. For example, as the raindrops in the scene 200 fall, the intrusion detection system 180 attempts to "follow" the raindrops (shown by reticle 230). As the intrusion detection system follows the raindrops, one or more false alarms may be triggered. Additionally, if the intrusion detection system 180 is busy following the movement of the raindrops, the intrusion detection system 180 may miss an actual threat (e.g., a trespasser, a bad actor). Accordingly, the effect of falling raindrops (and other environmental conditions) needs to be mitigated.

Referring back to FIG. 1, once the series of the images are captured over the time frame, the captured images 165 are provided to the image processing system 110. In an example, the captured images 165 are provide to the image processing system 110 over a network 150. Although a network 150 is specifically mentioned, other communication channels (e.g., Bluetooth, cable connection, infrared) may be used.

When the image processing system 110 receives the captured images 165, the captured images 165 may be stored (temporarily or permanently) in the storage system 120. The storage system 120 may provide the captured images 165 to the image analysis system 130.

The image analysis system 130 analyzes each pixel in each of the captured images 165 to determine a median pixel value for each pixel associated with a pixel coordinate. The median pixel value for a particular pixel coordinate is determined across the entire set of captured images 165 taken over the time frame.

For example, if the captured images 165 includes ten different images captured over one second, the image analysis system determines a pixel value for a pixel having X,Y coordinates of (0,0) in the first image of the captured images 165, determines a pixel value for a pixel having X,Y coordinates of (0,0) in the second image of the captured images 165, determines a pixel value for a pixel having X,Y coordinates of (0,0) in the third image of the captured images 165 and so on. The median pixel value of the pixels at the X,Y coordinates (0,0) is then determined. This process is repeated for all pixels (e.g., pixels having X,Y coordinates of (0, 1), (0, 2), (1, 0) and so on) in the captured images 165.

In an example, the pixel value for each pixel at pixel coordinates (0,0) in each captured image 165 may be as follows: 180 for the first image, 182 for the second image, 5 for the third image, 7 for the fourth image, 181 for the fifth image, 220 for the sixth image, 183 for the seventh image, 199 for the eighth image, 182 for the ninth image and 221 for the tenth image.

The image analysis system 130 receives these pixel values and determines a median pixel value. For example, the image analysis system 130 may order the pixel values in ascending order (e.g., 5, 7, 180, 181, 182, 182, 183, 199, 220, 221) (or in descending order) and may subsequently find the median pixel value for this particular set of pixels. In this example, the median pixel value is 182. The median pixel value for pixel coordinates (0,0) is provided to the image generation system 140. This process is then repeated for each pixel in each captured image having pixel coordinates of (0,1), (0,2) . . . (n,m).

Once the image generation system 140 receives the median pixel values for each pixel coordinate, the image generation system 140 generates a generated image 190. The generated image 190 is provided to the intrusion detection system 180 over a communication channel such as, for example, the network 150. In an example, the generated image 190 is an image in which the effects of fast moving objects in a scene have been mitigated.

Figure 2B:
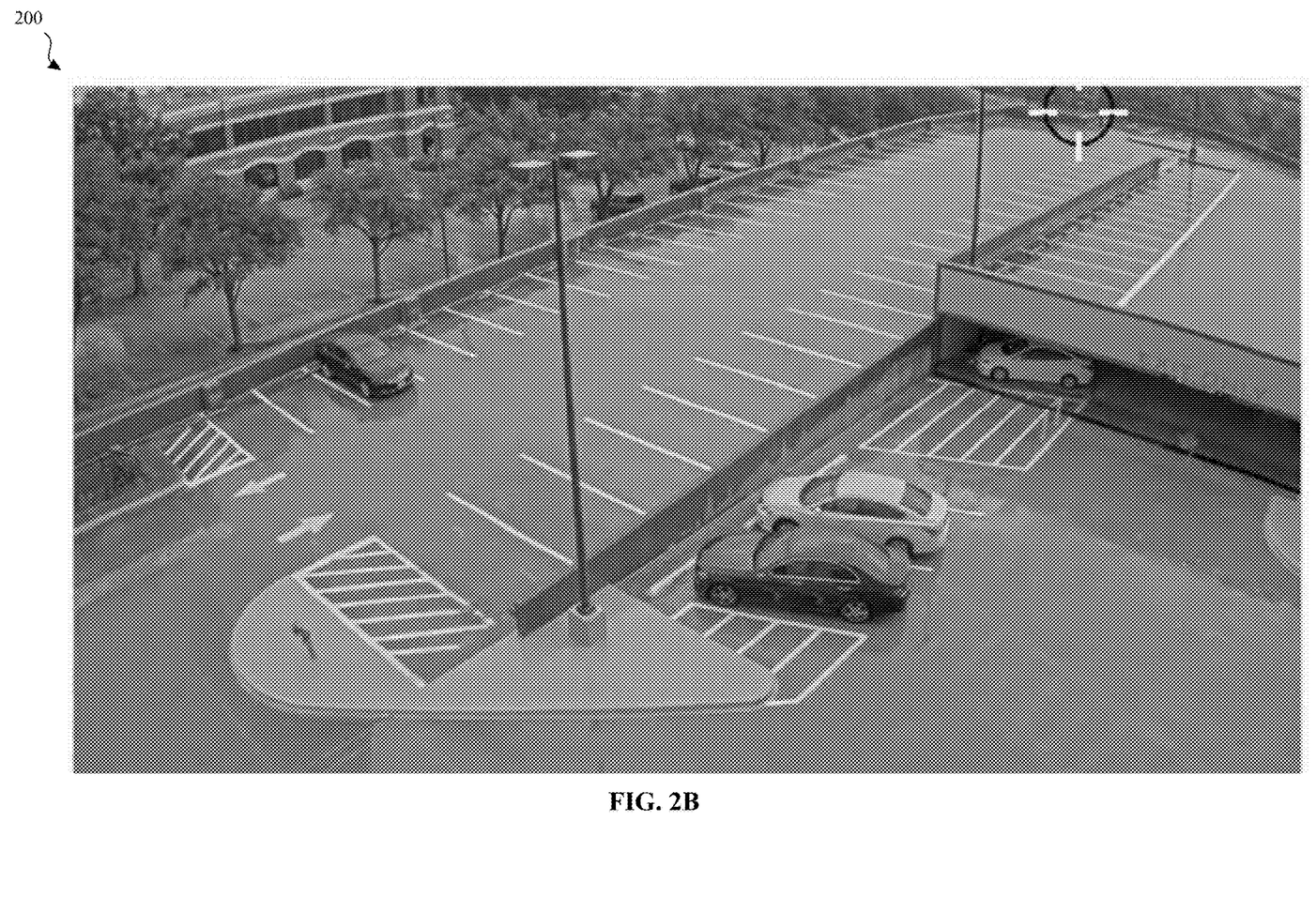
FIG. 2B illustrates the example scene of FIG. 2A in which the effects of fast moving objects have been mitigated according to an example.

For example and referring to FIG. 2B, FIG. 2B illustrates the example scene 200 of FIG. 2A in which the effects of the raindrops moving through the scene 200 have been mitigated. As shown in FIG. 2B, most, if not all, of the raindrops moving through the scene 200 have been eliminated. As a result, the frequency of false alarms caused by environmental conditions is reduced and/or eliminated. Accordingly, the intrusion detection system 180 is able to focus on detecting the presence of a potential threat without sacrificing accuracy.

In an example, the image analysis system 130 may determine a threshold number of pixel values to consider when determining the median pixel value for the various pixel coordinates. For example, if ten images are contained in the captured images 165, the image analysis system 130 may disregard the top three values and the bottom three values and find the median pixel value using the remainder of pixel values.

Continuing with the example above, the image analysis system 130 may disregard the pixel values of 5, 7, 180, (corresponding with pixel values for the third image, the fourth image and the first image respectively) and pixel values of 199, 220, 221 (corresponding with pixel values for the eighth image, the sixth image and the tenth image respectively). As a result, the image analysis system 130 may determine the median pixel value for the four remaining pixels 181, 182, 182, and 183 (corresponding to the fifth image, the second image, the ninth image and the seventh image respectively). The median pixel value may be used to generate a resulting image such as previously described.

In another example, the image analysis system 130 may determine the mean of the threshold range of pixel values (e.g., the mean of the pixel values 181, 182, 182, and 183) and return the resulting value to the image generation system 140 as the median pixel value for that particular pixel coordinate.

The threshold number of pixel values to be considered when determining the median pixel value may be automatically adjusted in real-time or substantially real-time. The adjustment may be based on a number of factors. These factors may include, but are not limited to, a number of false alarms detected by the intrusion detection system 180, detected/determined environmental conditions in an environment in which the system 100 is operating, individual preferences/settings, pixel coordinates (e.g., pixels associated with certain coordinates in a captured image may have a first threshold while pixels associated with other coordinates may have a second, different threshold) and the like.

Likewise, the time threshold of the time frame and/or the number of captured images 165 in the given time frame may be automatically and/or manually adjusted based on various factors. These factors may include, but are not limited to, a number of false alarms detected by the intrusion detection system 180, detected/determined environmental conditions in an environment in which the system 100 is operating, individual preferences/settings and the like.

Figure 3:
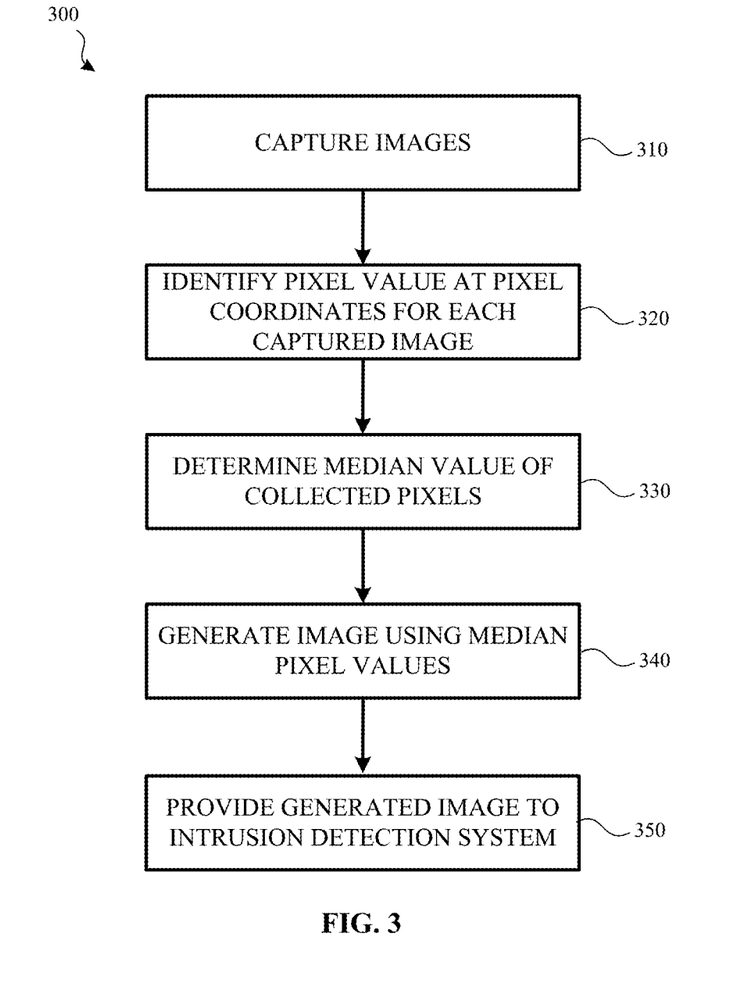
FIG. 3 illustrates a method for mitigating the effects of fast moving objects in a scene captured by a camera-to-camera control system according to an example.

FIG. 3 illustrates a method 300 for mitigating the effects of fast moving objects in a scene captured by a camera-to-camera control system according to an example. The method 300 may be performed by one or more systems of the system 100 shown and described with respect to FIG. 1.

Method 300 begins when a series of images are captured (310). In an example, the series of images are captured by one or more image capture devices. The series of images may be taken in specified time frame (e.g., one second, five seconds, ten seconds, one minute). In an example, the series of images may be still images. In another example, the series of images are frames of a captured video.

Once the series of images has been captured for the specified period of time, the series of images is provided to an image analysis system. The image analysis system identifies (320) a pixel value for each pixel coordinate in each captured image in the series of captured images. For example, the image analysis system identifies/determines a pixel value for a pixel located at X,Y coordinate (0,0) in the first image, a pixel value for a pixel located at X,Y coordinate (0,0) in the second image, a pixel value for a pixel located at X,Y coordinate (0,0) in the third image and so on. This process is repeated for all pixel coordinates for each image in the series of captured images.

The image analysis system then determines (330) a median value for each pixel that is associated with the same pixel coordinates. For example, the image analysis system determines the median pixel value for X,Y coordinates of (0,0) for a resulting image using the median pixel value of the pixel located at X,Y coordinate (0,0) of the first image, the pixel value for the pixel located at X,Y coordinate (0,0) of the second image, the pixel value of the pixel located at X,Y coordinate (0,0) of the third image and so on.

When the median pixel value of all the pixel coordinates have been determined, the median pixel values are used to generate (340) a resulting image. The resulting image is then provided (350) to an intrusion detection system.

Figure 4:
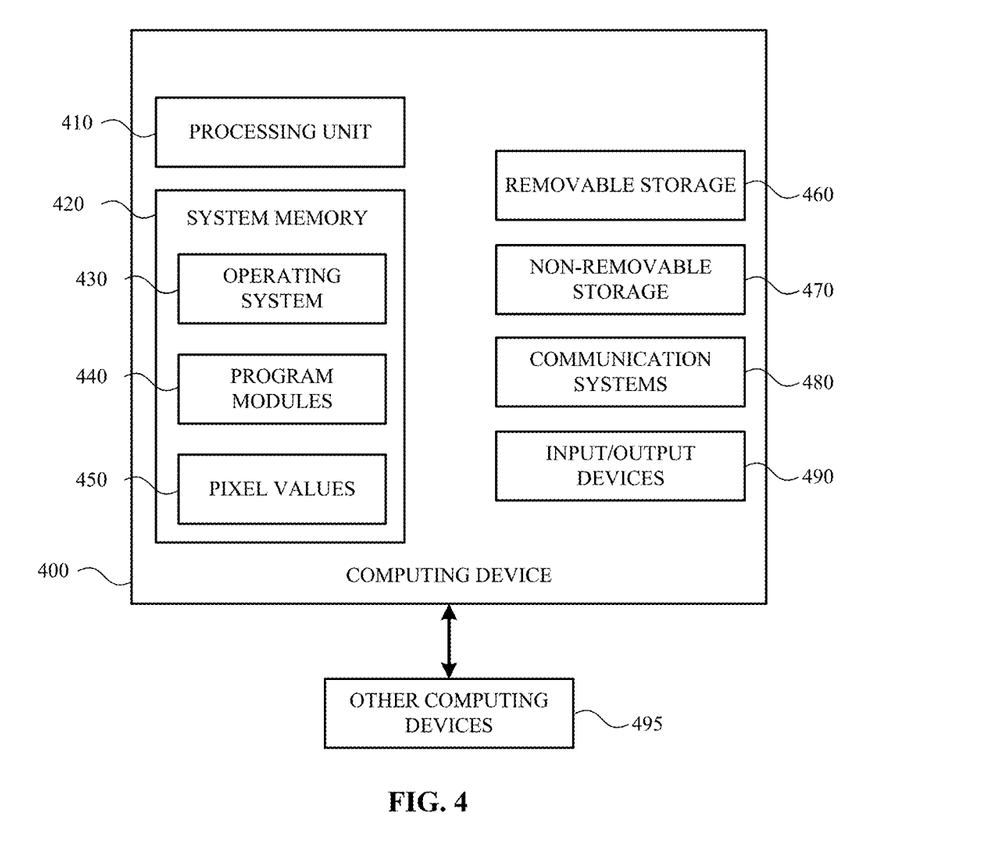
FIG. 4 is a block diagram of a computing device according to one or more examples.

FIG. 4 is a system diagram of a computing device 400 according to an example. The computing device 400, or various components and systems of the computing device 400, may be integrated or associated with an image capture device, an intrusion detection system, and/or an image processing system. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering images, analyzing images, determining median pixel values 450 and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving a series of captured images of a particular scene over a time period;
   identifying a first pixel in each captured image of the series of captured images, wherein the first pixel in each captured image of the series of captured images is associated with a pixel coordinate;
   determining a set of pixel values, including a pixel value for each first pixel in each captured image of the series of captured images;
   eliminate a first predetermined number of top pixel values and a second predetermined number of bottom pixel values from the set of pixel values to form a modified set of pixel values;

determining a median pixel value of the modified set of pixel values;

associating the median pixel value with the pixel coordinate of a resulting image; and determining the first predetermined number of top pixel values and the second predetermined number of bottom pixel values based on one of a number of false alarms detected and an environmental factor.

2. The method of claim 1, further comprising providing the resulting image to an intrusion detection system.

3. The method of claim 1, further comprising identifying a second pixel in each captured image of the series of captured images.

4. The method of claim 3, further comprising:

providing the second pixel in each captured image of the series of captured images as associated with a second pixel coordinate and, further comprising determining a second pixel value for each second pixel in each captured image of the series of captured images.

5. The method of claim 4, further comprising determining a second median pixel value of the second pixel values.

6. The method of claim 5, further comprising associating the second median pixel value with the second pixel coordinate of the resulting image.

7. The method of claim 1, further comprising determining a mean pixel value for the modified set of pixel values.

8. The method of claim 1, further comprising:

selecting the first predetermined number of top pixel values as 3; and selecting the second predetermined number of bottom pixel values as 3.

9. A system, comprising:

a processor;

a memory coupled to the processor and storing computer executable instructions that, when executed by the processor, perform operations, comprising:

receiving a series of captured images associated with a time frame;

identifying a first pixel in each captured image of the series of captured images, wherein the first pixel in each captured image of the series of captured images is associated with a pixel coordinate;

determining a set of pixel values including a pixel value for each first pixel in each captured image of the series of captured images;

eliminate a first predetermined number of top pixel values and a second predetermined number of bottom pixel values from the set of pixel values to form a modified set of pixel values;

determining a median pixel value of the modified set of pixel values;

associating the median pixel value with the pixel coordinate of a resulting image; and determining the first predetermined number of top pixel values and the second predetermined number of bottom pixel values based on one of a number of false alarms detected and an environmental factor.

10. The system of claim 9, further comprising instructions for providing the resulting image to an intrusion detection system.

11. The system of claim 9, further comprising instructions for identifying a second pixel in each captured image of the series of captured images.

12. The system of claim 11, wherein the second pixel in each captured image of the series of captured images is associated with a second pixel coordinate, and further comprising instructions for determining a second pixel value for each second pixel in each captured image of the series of captured images.

13. The system of claim 12, further comprising instructions for determining a second median pixel value of each of the second pixel values.

14. The system of claim 13, further comprising instructions for associating the second median pixel value with the second pixel coordinate of the resulting image.

15. The system of claim 9, further comprising instructions for determining a mean pixel value for the modified set of pixel values.

* * * * *